United States Patent [19]
Brown

[11] Patent Number: 5,179,875
[45] Date of Patent: Jan. 19, 1993

[54] TURBINE SPEED CONTROLLER FOR AN AUTOMATIC TRANSMISSION

[75] Inventor: Larry T. Brown, Dearborn, Mich.

[73] Assignee: Ford Motor Company, Dearborn, Mich.

[21] Appl. No.: 673,606

[22] Filed: Mar. 22, 1991

[51] Int. Cl.⁵ .................. F16H 59/42; F16H 61/02
[52] U.S. Cl. ................................. 74/866; 364/424.1
[58] Field of Search ............... 74/866; 364/424.1; 192/0.052, 0.076, 3.3

[56] References Cited

U.S. PATENT DOCUMENTS

| | | | |
|---|---|---|---|
| 3,497,043 | 2/1970 | Leonard | 192/0.052 |
| 3,714,836 | 2/1973 | Pierce, Jr. et al. | 74/752 |
| 4,106,368 | 8/1978 | Ivey | 364/424.1 X |
| 4,220,058 | 9/1980 | Ivey | 364/424.1 X |
| 4,265,346 | 5/1981 | Emmadi | 192/0.034 |
| 4,457,411 | 7/1984 | Hiramatsu | 192/0.076 |
| 4,582,185 | 4/1986 | Grimes et al. | 192/0.076 |
| 4,757,886 | 7/1988 | Brown | 192/3.3 |
| 4,875,391 | 10/1989 | Leising et al. | 74/866 |
| 4,966,050 | 10/1990 | Schulz et al. | 74/867 |
| 5,029,087 | 7/1991 | Cowan et al. | 74/866 X |
| 5,046,178 | 9/1991 | Hibner et al. | 74/866 X |

Primary Examiner—Richard Lorence
Assistant Examiner—Khoi Q. Ta
Attorney, Agent, or Firm—Frank G. McKenzie; Roger L. May

[57] ABSTRACT

A control for a torque converter transmission having a pressure-operated torque input clutch that establishes and disestablishes a torque flow path between an engine and torque input elements of a multiple-ratio transmission comprising a solenoid-operated clutch control and an electronic controller and clutch control valve structure whereby the clutch pressure is regulated in a closed loop manner as the controller responds to turbine speed changes to effect a controlled pressure buildup in the clutch when clutch engagement is desired so that the rate of engagement corresponds to an optimum calibrated rate to eliminate harshness in clutch engagement and also to prevent an undesirable transient engine speed increase during start-up.

7 Claims, 6 Drawing Sheets

FIG. 1.

|  |  | REV | FWD | DIR | LO/REV | 5 CL | 2/4 BAND | HB & REV BAND | 3 GR OWC | 1 GR OWC | 1-4 GR OWC |
|---|---|---|---|---|---|---|---|---|---|---|---|
| 1ST | DR |  | X |  |  |  |  |  |  | X | X |
|  | HB |  | X |  | X |  |  | X |  |  |  |
| 2ND | DR |  | X |  |  |  | X |  |  |  | X |
|  | HB |  | X |  |  |  | X | X |  |  |  |
| 3RD | DR |  | X | X |  |  |  | HB |  |  | X |
|  | DR2 |  |  | X |  |  |  | HB | X |  |  |
| 4TH | DR |  |  | X |  |  | X |  |  |  | X |
|  | HB |  |  | X |  |  | X |  |  |  |  |
| 5TH | DR |  |  | X |  | X | X | X |  |  |  |
| REV |  | X |  |  | X |  |  | X |  |  |  |

TURBINE SPEED CONTROLLER FOR AN AUTOMATIC TRANSMISSION

TECHNICAL FIELD

This invention relates generally to electronically controlled, multiple-ratio transmissions and to an electronic controller for regulating the rate of engagement of a forward drive clutch or a reverse clutch.

BACKGROUND OF THE INVENTION

My invention is adaptable for use in an automatic transmission of the kind as shown, for example, in U.S. Pat. Nos. 3,714,836 and 3,497,043, which are assigned to the assignee of this invention.

In the case of the transmission shown in the '836 patent, a hydrokinetic torque converter has an impeller connected to an internal combustion engine in a vehicle driveline and a turbine adapted to be connected to torque input elements of the gearing through friction clutches, one clutch being effective for forward drive and the other clutch being effective for reverse drive. When the transmission is in neutral, both clutches are disengaged. Thus, the converter effectively then is disconnected from the planetary gearing.

Upon engagement of the clutch to establish forward drive operation, the turbine is connected directly to an input element of a planetary gear unit through the forward clutch. A reaction brake on the carrier for the gear unit establishes a reaction point as a forward-driving, low-speed ratio torque flow path is established between the turbine and the power output shaft of the transmission.

The neutral condition is established by a manual valve which interrupts the flow of fluid from the pressure source to the clutches when the manual valve is in the neutral position. If the manual valve is shifted from the neutral position to the forward drive position, clutch actuating pressure is distributed to the forward clutch. Similarly, if the manual valve is shifted from the neutral position to the reverse drive position, the reverse clutch becomes engaged, thereby establishing a driving connection between the turbine and a different torque input element of the gearing as a reverse torque flow path is established between the turbine and the power output shaft of the transmission.

The transmission of the '043 patent includes four forward driving ratios and a single reverse ratio in contrast to the transmission of the '836 patent, which has three forward driving ratios. Like the transmission of the '836 patent, the transmission of the '043 patent includes a manual valve adapted to distribute pressure to a forward clutch when the manual valve is moved to the forward drive position from the neutral position. This establishes a driving connection between the turbine of a hydrokinetic torque converter and the input ring gear of a first of three planetary gear sets. If the manual valve is moved to the reverse position from the neutral position, the reverse clutch is engaged, thus establishing a driving connection between the turbine and the sun gear of a second gear set.

In each of the transmission arrangements of the reference patents, the converter turbine is disconnected from the power output shaft and from the traction wheels of the vehicle when the manual valve is in the neutral (or park) position. This is due to the fact that the forward clutch and the reverse clutch then are disengaged, thereby interrupting the torque flow path from the turbine. The turbine, in effect, is unloaded under these conditions. When the manual valve is moved from the neutral or park position to the drive position, the forward clutch is pressurized. As capacity builds up in the forward clutch, the turbine thus becomes coupled to the traction wheels through the planetary gearing.

Provision is made for softening the engagement of the forward clutch or the reverse clutch. If the pressure is allowed to rise in the clutches too rapidly, that may cause a so-called clutch engagement bump. On the other hand, if the clutch pressure in the reverse clutch or the forward clutch is allowed to buildup too slowly, the transmission engagement may be delayed. It is possible then for an engine speed-up to occur as the driver depresses the throttle before the clutch is fully engaged. This creates an inertia force that is felt as a shock by the driver of the vehicle upon late engagement of the clutch.

I am aware of various attempts to eliminate clutch engagement shock when the manual valve is shifted from the park or neutral position to either the reverse drive position or the forward drive position. An example of a control mechanism that compensates for this shock is shown in U.S. Pat. No. 4,966,050, which also is assigned to the assignee of this invention. The transmission control of the '050 patent includes a valve member located between a friction clutch associated with planetary gearing and a pressure source, which usually is a positive displacement pump. The pressure of the pump is regulated by a main pressure regulator valve. An overdrive clutch serves as an accumulator which communicates through an orifice with a line pressure passage on the downstream side of a cushioning valve. The pressure in the overdrive clutch or the so-called accumulator acts on the cushioning valve to effect a gradual pressure buildup in the transmission friction clutch.

Another prior art arrangement for controlling harshness in the engagement of a transmission friction clutch is taught by U.S. Pat. No. 4,265,346, which also is assigned to the assignee of this invention. That patent discloses a clutch engagement control valve located in a clutch feed passage in parallel disposition with respect to the servo for the clutch. The clutch control valve regulates the pressure in the clutch following a command for clutch engagement by progressively restricting the control pressure feed flow path to the clutch in response to a pressure buildup in the clutch. The pressure buildup is caused to act on the valve to oppose a valve spring acting on the valve. The force of the spring is supplemented by the force of an accumulator pressure in the accumulator mechanism situated in fluid communication with the valve chamber occupied by the spring so that the accumulator pressure force complements the force of the spring. A torque signal is distributed to the accumulator to raise the effective accumulator pressure level, depending upon the magnitude of the torque distributed to the input side of the transmission mechanism from the engine.

BRIEF DESCRIPTION OF THE INVENTION

My invention comprises an electronic clutch engagement controller for use in an automatic transmission of the kind described in the preceding discussion of the background art. It makes possible an improvement in the engagement sequence by modulating the forward clutch pressure in a closed loop manner to eliminate undesirable inertia forces. It requires a continuous monitoring of the turbine speed of the torque converter in the automatic transmission.

My improved controller may be adapted for a variety of transmission control systems presently known in the art, many of which include a lockup clutch for the hydrokinetic torque converter which may be engaged during steady state operation of the transmission to improve fuel economy. Such transmissions normally require the use of a turbine speed sensor. Thus, my improved clutch engagement controller does not require an independent turbine speed sensor since such a sensor already is used in electronically controlled transmissions with lockup clutches for the converter. There is minimal additional hardware cost, therefore, in adapting my invention to most transmission control systems.

An example of a transmission with a turbine speed sensor for use with an electronically controlled lockup clutch is shown in my earlier U.S. Pat. No. 4,757,886, which describes a control with clutch engagement feedback for a lockup clutch to effect controlled converter slip. A further example is shown in patent application Ser. No. 383,506, filed Jul. 24, 1989 now U.S. Pat. No. 5,029,087, dated Jul. 2, 1991. Both the '886 patent and patent application Ser. No. 383,506 are assigned to the assignee of this invention.

In a transmission system embodying the improvements of my invention, a manual lever is used to select drive ranges as well as the neutral and park conditions for the vehicle. When the manual lever is moved from the neutral position to the forward drive range position, for example, an engagement of the forward drive clutch is required. A duty cycle controlled forward clutch solenoid valve is adapted to effect stroking of the forward clutch. After a predetermined time following the command for engagement of the clutch and after confirmation of the stroke pressure is made by a pressure switch, a forward clutch pressure ramp operation is initiated during which the clutch pressure is increased at a controlled rate. During the engagement cycle, the turbine speed is constantly monitored. When the speed of the turbine drops by a predetermined value, the speed ramp command is initiated and a closed loop turbine speed control is set into operation.

The turbine speed control of the clutch engagement is commanded at a predetermined value for the actual turbine speed at the beginning of the closed loop cycle. The ramp that represents the commanded turbine speed then progresses to a zero turbine speed while the closed loop clutch controller modulates the forward clutch pressure to make the turbine speed follow a predetermined ramp slope. When the actual speed is a predetermined value above the zero speed, the forward clutch pressure is set to its maximum value, and the engagement of the clutch then is complete.

The controller effects a closed loop clutch response that makes successive engagements of the clutch repeatable with the same engagement characteristics over time. Thus, the calibration of the clutch engagement is independent of clutch wear as well as differences in fluid temperature and other variables.

The same strategy that is used for applying the forward drive clutch may be used for applying the reverse drive clutch as the manual lever is moved from the neutral or park position to the reverse position.

BRIEF DESCRIPTION OF THE DRAWINGS

FIG. 5 is a block diagram of the turbine speed controller that is used to control the engagement of the forward clutch or the reverse clutch so that the actual turbine speed during the engagement phase approximates the value of a commanded speed that is stored as a table value in the memory portion of the microcomputer.

PARTICULAR DESCRIPTION OF THE INVENTION

In an automatic transmission employing friction clutches and brakes of the kind described in the background discussion, the clutches are engaged by fluid pressure operated servos. Ratio changes occur as the clutches and brakes are applied and released and as the torque reaction points in the transmission gearing are changed.

The magnitude of the pressure that is applied to the clutches and brakes is determined by the engine throttle opening. The dynamic capacity of the clutch is proportional to the input torque. When a clutch is engaged during start-up or during a shift, the torque flow path from the engine to the vehicle traction wheels is characterized by a momentum flow as the torque flow path is activated and deactivated. If the establishment of the momentum flow should occur in a very short time, the engagement of the clutch will produce an undesirable harshness.

The sliding torque capacity of the engaging clutch during start-up, for example, is subject to variations in the friction coefficient due to wear, temperature, variations in lubricant friction coefficient, etc. Pressure variations during start-up also are present, and these are due to tolerances of dimensions, spring loads and adjustments, as well as other factors. By monitoring the clutch input speed and comparing it to an idealized speed throughout the engagement period, an error signal can be developed and a corrective change in the clutch pressure can be implemented. The engagement can be made self-adjusting. The system can be described, therefore, as an adaptive system as appropriate corrections are made by the solenoid valve that establishes the correct clutch pressure for a particular engine and driveline. The system thus is a learning, self-calibrating system which can reduce variations in the engagement feel of the forward clutch and the reverse clutch.

Figure 1:
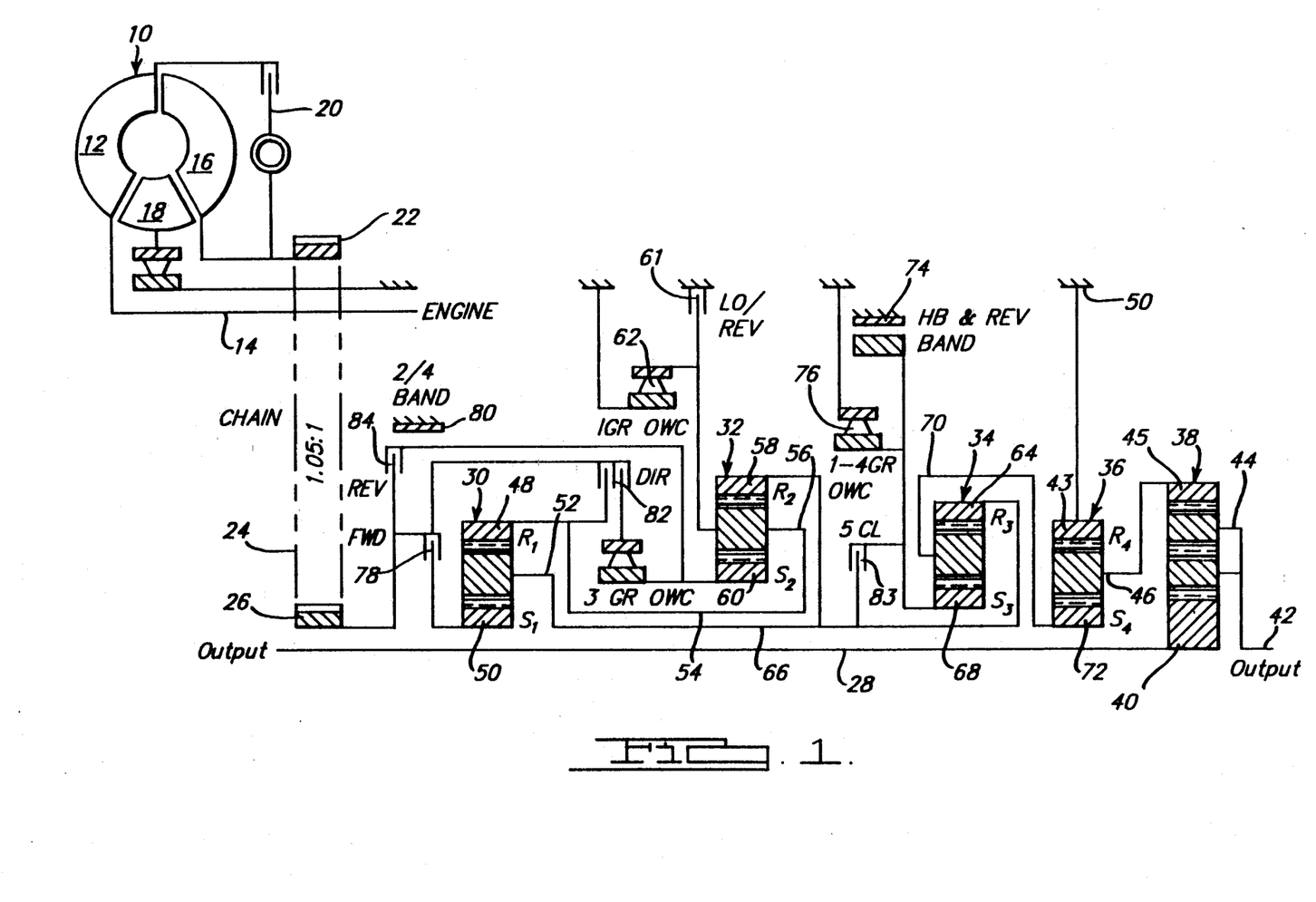
FIG. 1 is a schematic line diagram of a planetary transmission with a reverse clutch and a forward clutch, which may be adapted to use the controller of my invention.

Referring first to FIG. 1, I will describe a typical planetary gear transmission having a disengageable reverse clutch and a disengageable forward clutch. Although my invention may be adapted to a variety of planetary gear transmissions, the transmission of FIG. 1 is chosen merely to provide a structural environment for my invention.

When the vehicle is stationary and the transmission is in the neutral or park condition, the transmission manual valve, actuated by a so-called PRNDL selector lever controlled by the vehicle operator, causes the converter turbine to be disconnected from the wheels because the forward clutch and the reverse clutch are disengaged. Thus, the wheels are stationary because no torque is transmitted through the converter impeller. As the manual valve is moved from the park or neutral position to the drive or reverse position, the forward clutch or the reverse clutch is pressurized and the clutch capacity builds up. Thus, the turbine becomes coupled to the wheels through the planetary gearing, and the turbine speed decreases toward zero until it stalls. If the forward clutch or reverse clutch is applied too rapidly, an engagement bump or harshness will occur. On the other hand, if the forward clutch pressure builds too slowly, an engine flare-up will result if the engine throttle is advanced before the clutch is engaged.

As mentioned previously, clutch engagement normally is controlled in a so-called open loop manner in prior art designs by modulating the pressure made available to the clutch to cushion the clutch engagement. Usually, pressure accumulators of the kind described in the preceding background art discussion are used. This is unlike the closed loop strategy of my invention.

The transmission of FIG. 1 includes a hydrokinetic torque converter 10 having a bladed impeller 12 that is connected drivably to the crankshaft 14 of an internal combustion engine (not shown). A bladed turbine 16 and a bladed stator 18 are arranged in toroidal fluid flow relationship with respect to the impeller in the normal manner so that engine torque delivered to the impeller is multiplied hydrokinetically to produce a turbine torque that is equal to the engine torque times a factor greater than unity until a so-called coupling stage is reached. The torque multiplication that occurs in this fashion is a maximum when the turbine is stalled, and it reaches a torque ratio of unity at the coupling point of the converter, at which time the stator freewheels.

The converter of FIG. 1 includes a modulated converter bypass clutch which is adapted to connect the impeller and the turbine to establish a mechanical, parallel torque flow path around the converter during steady state operation of the driveline.

The turbine 16 is connected to a torque input sprocket 22 of a chain transfer drive 24. The driven sprocket 26 rotates about the axis of the torque output shaft 28, the latter being parallel and spaced from the crankshaft axis 14.

The transmission of FIG. 1 includes four planetary gear units shown at 30, 32, 34 and 36, as well as a differential planetary gear unit 38. The gear units 30–36 are disposed coaxially with respect to the output shaft 28. One end of the output shaft 28 is connected to sun gear 40 of the differential gear unit 38. Another output shaft 42 is connected to compound carrier 44 of differential gear unit 38. Shaft 28 is connected to one of the vehicle traction wheels, and shaft 42 is connected to the opposite vehicle traction wheel, suitable universal couplings being provided for this purpose.

The differential gear unit 38 includes a ring gear 45 which is connected to the carrier 46 of gear unit 36, the latter acting as a final drive. Ring gear 43 for the final drive gear unit 36 is anchored to the transmission housing as shown at 50. The carrier 46 acts as a torque output member for the gear unit 36. It is connected drivably to ring gear 45 of the differential gear unit 38.

Gear unit 30 comprises ring gear 48 and sun gear 50. Planet pinions, which mesh with the sun and ring gears, are carried by carrier 52. A sleeve shaft 54 connects ring gear 48 with carrier 56 of the second planetary gear unit 32. That gear unit includes, in addition to the carrier 56, ring gear 58 and sun gear 60, which mesh with pinions carried by the carrier 56. Carrier 56 is adapted to be anchored to the stationary housing by low-and-reverse brake 61, which is effective during hill braking and coasting operations. Normally, the carrier 56 is anchored to the housing through an overrunning brake shown generally at 62.

Ring gear 58 is adapted to be connected to carrier 52 and to ring gear 64 of the third planetary gear unit 34. The connection is established by a sleeve shaft 66.

In addition to ring gear 64, the gear unit 34 includes sun gear 68 and pinions meshing with the ring gear and sun gear. The pinions are carried by carrier 70. Carrier 70 is connected to sun gear 72 of fourth planetary gear unit 36.

Sun gear 68 of third planetary gear unit 34 is anchored during reverse operation and during hill brake or coasting operation by brake band 74. During operation in the first four forward driving speed ratios, sun gear 68 is adapted to be anchored to the transmission housing by overrunning brake 76 so that the sun gear 68 serves as a reaction point.

Forward clutch 78 is adapted to drivably connect driven sprocket 26 of the transfer drive 24 to the input sun gear 50. The clutch 78 is adapted to be controlled, on its engagement, by the turbine speed controller of my invention. When it is applied, input torque is transferred through it to sun gear 50. Ring gear 48 acts as a reaction point at this time because it is anchored by the overrunning brake 62.

Carrier 52 receives output torque, and that torque is transferred through sleeve shaft 66 to ring gear 64 of the third planetary gear unit 34. Sun gear 68 is stationary during each of the first forward driving ratios, as mentioned earlier, so the carrier 70 and the sun gear 72 of the final drive gear unit 36 are driven.

To effect a ratio change to the second ratio, the forward clutch is applied, as mentioned earlier, and the brake band 80 is applied, thus anchoring sun gear 60. Overrunning brake 62 begins to freewheel under these conditions as the sun gear 60 of the second planetary gear unit serves as a reaction point. Again, the ring gear 58 drives sleeve shaft 66 and ring gear 64 of the third planetary gear unit, which causes output torque to be distributed from the carrier 70 to the sun gear 72 of the final drive gear unit 36.

A ratio change to the third ratio from the second ratio is effected by engaging direct drive clutch 82, which removes the first planetary gear unit from the torque flow path and establishes a torque delivery connection through clutch 78 and clutch 82 to sleeve shaft 54. Because clutches 78 and 82 are applied, both gear units 30 and 32 are locked up with a one-to-one ratio. Sun gear 68 of the third planetary gear unit 34 serves as a reaction point since it is anchored to the housing through overrunning brake 76.

The fourth ratio is effected by releasing the forward clutch 78 while the direct clutch 82 remains applied. The brake band 80 is applied as it was during operation in the second ratio. Thus, sun gear 60 acts as a reaction point as driving torque is transferred to the carrier 56 through the direct drive clutch 82. Sun gear 68 is braked by the overrunning brake 76 so the carrier 70 drives the sun gear 72 of the final drive gear unit. The fifth ratio is achieved by engaging fifth speed ratio clutch 83. This, in effect, connects together two elements of the planetary gear unit 34, thereby causing the gear unit 34 to operate with a one-to-one ratio.

Reverse drive is obtained by engaging reverse clutch 84. This clutch can be engaged by means of the turbine speed controller of my invention. When it is engaged, the reverse brake 61 is applied, thus allowing the carrier 56 of the second planetary gear unit 32 to act as a reaction point. Reverse driving torque is delivered directly from the torque input sprocket 26 to sun gear 60. Since the sun gear 60 now acts as an input element, the ring gear 58 is driven in a reverse direction, which drives ring gear 64 of the third planetary gear unit. With the sun gear 68 being anchored by the reverse band 74 carrier 70 and sun gear 72 are driven in a reverse direction.

Figure 2:
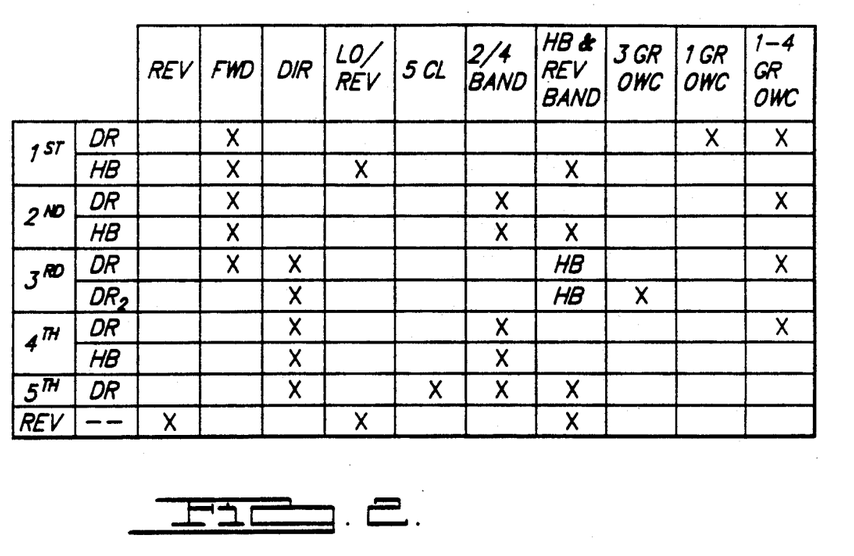
FIG. 2 is a table that shows the clutch and brake engagement-and-release pattern for controlling the relative motion of the planetary gear elements of the transmission of FIG. 1 to establish each of five forward driving ratios and a single reverse ratio.

For a better understanding of the mode of operation of the transmission structure of FIG. 1, reference may be made to the chart of FIG. 2 where the clutch engagement-and-release pattern and the brake engagement-and-release pattern are set forth for each of the five forward drive ratios as well as the reverse ratio. The ratios in the transmission are indicated in the left-hand column. The symbols DR and HB refer, respectively, to the drive condition and the hill brake condition. The various clutches and brakes are identified on a horizontal line at the top of the chart of FIG. 2. The labels found in FIG. 2 to identify the clutches and brakes are repeated in the schematic diagram of FIG. 1 in order to correlate the table with the schematic drawing of FIG. 1.

In accordance with the teachings of my invention, the engagement sequence is achieved by modulating the forward clutch pressure in a closed loop manner. The performance variable that is monitored during the engagement control is the turbine speed.

Figure 3:
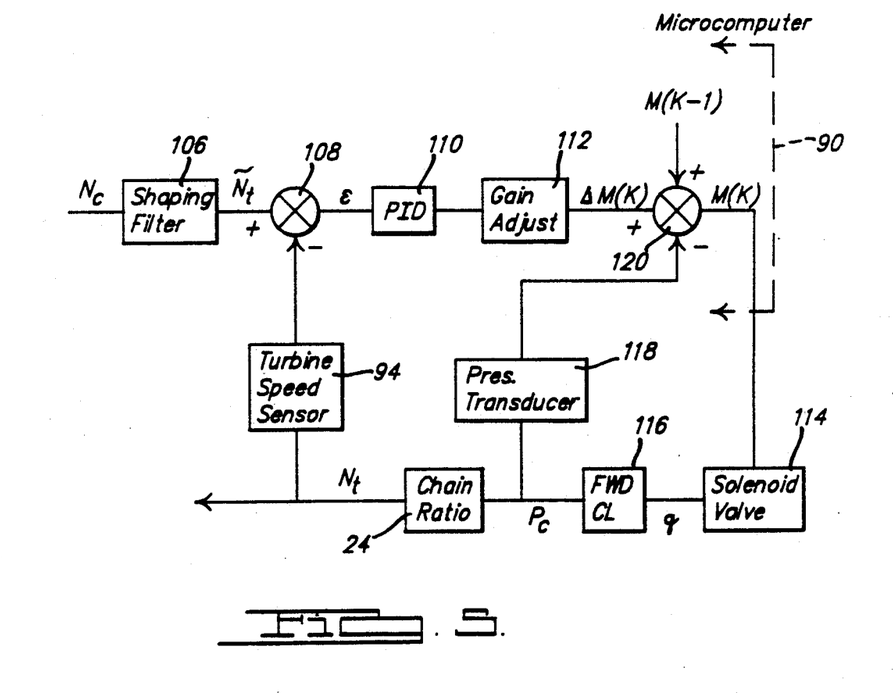
FIGS. 3A and 3B show a schematic diagram of the overall system showing the physical relationship between the microcomputer, the hydraulic valve body and the multiple-ratio transmission, together with schematic representations of the sensors that develop input signals for the microcomputer.
Figure 3A:
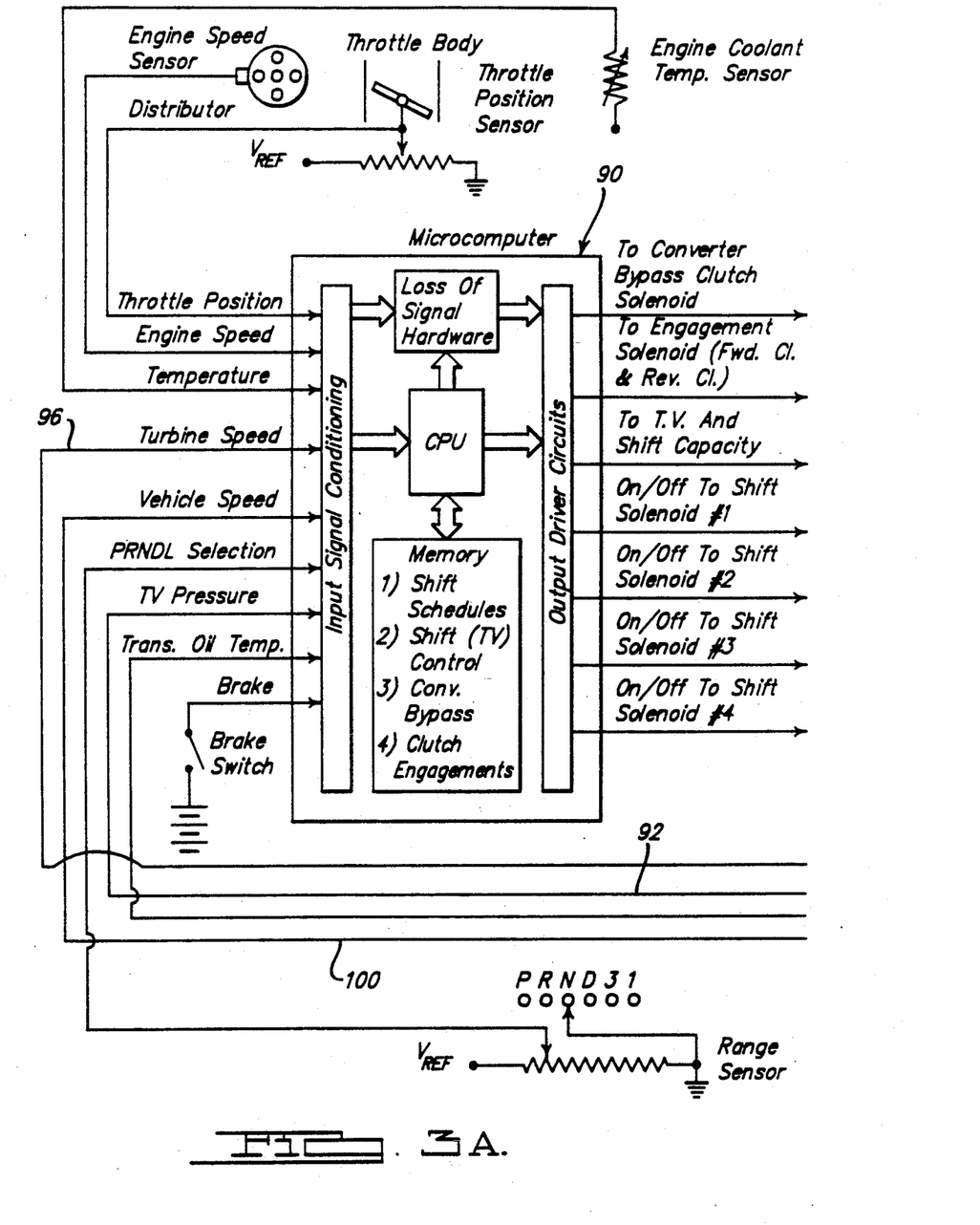
Figure 3B:
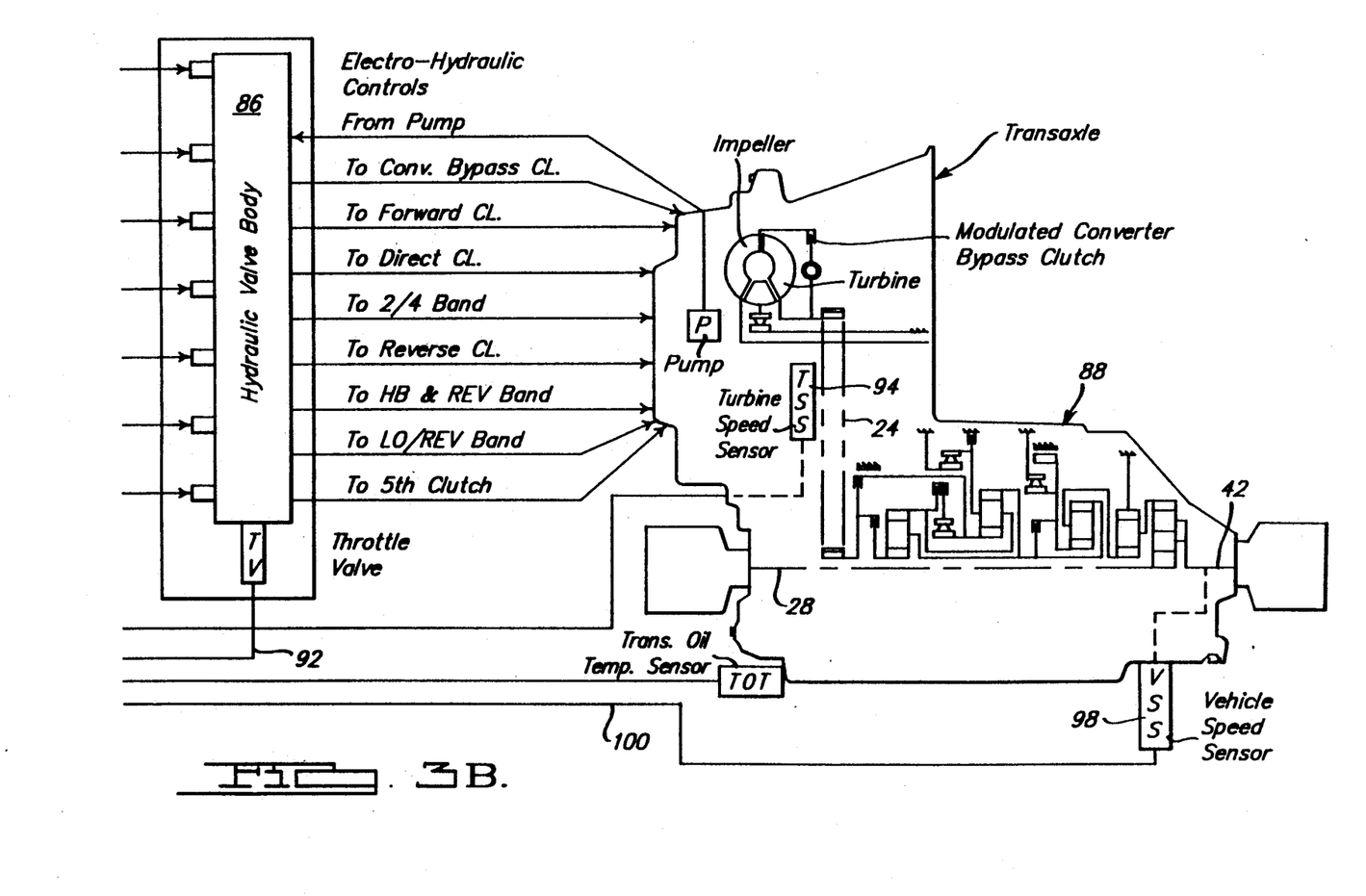

FIGS. 3A and 3B show a schematic representation of the overall system including the microcomputer, the electro-hydraulic control circuitry, and the planetary transmission or transaxle. The microcomputer of FIG. 3 operates in conjunction with the hydraulic valve body of the electro-hydraulic controls to control the modulated converter bypass clutch as well as the clutches and brakes.

A description of the operation of a microcomputer and electro-hydraulic controls for controlling circuit pressure and ratio changes in a comparable planetary transmission or transaxle can be seen by referring to application Ser. No. 583,614, filed Sept. 14, 1990. That application is owned by the assignee of this invention. Similarly, for an understanding of the operation of a converter bypass clutch in conjunction with a microcomputer and electro-hydraulic controls can be obtained by referring to previously mentioned U.S. application Ser. No. 383,506, filed Jul. 24, 1989, now U.S. Pat. No. 5,029,087.

The microcomputer that is described in these pending patent applications performs the control functions for the converter bypass clutch, the clutch and brake servo pressure control and the shift control. It may be adapted also, however, to control the rate of application of the forward clutch or the reverse clutch in accordance with the teachings of my present invention.

The portions of the microcomputer that are significant with respect to the present invention include a turbine speed sensor TSS, as shown in FIG. 3B, the output of which is distributed to the input signal conditioning portion of the microcomputer. A so-called commanded turbine speed is stored in the memory of the computer as a function of time so that during the engagement mode of the forward clutch, the contents of the portions of the memory in which the commanded speed is stored is fetched by the computer address pointer during each background loop of the microcomputer. It is transferred then to a temporary storage register which in turn is addressed by the CPU portion of the microcomputer. A comparison is made by the CPU portion to determine whether the commanded speed is different than the actual speed of the turbine as measured by the turbine speed sensor. That comparison is made during each background loop. As will be explained subsequently, the differences between the actual speed and the commanded speed are closely monitored and appropriate adjustments are made in the clutch pressure during the clutch engagement interval so that the actual speed of the turbine will approach the ideal commanded speed. The microcomputer makes appropriate adjustments in the clutch pressure in a closed loop manner.

In FIG. 3B, the electro-hydraulic controls are shown at 86. The controls 86 are adapted to distribute clutch and brake pressures to the servos for the clutches and brakes of the transmission generally identified by reference numeral 88 in FIG. 3. The hydraulic valve body of the electro-hydraulic controls responds to electronic signals that are developed by the microcomputer shown generally at 90. In the particular system illustrated in FIGS. 3A and 3B, these electronic signals include a converter bypass clutch solenoid signal, a TV solenoid signal, which is a measure of engine torque, and four shift solenoid signals. The TV solenoid signal controls shift capacity and line pressure. Throttle valve pressure is distributed to the input signal conditioning portion of the microcomputer 90 through line 92. The turbine speed signal is distributed from the turbine speed sensor TSS shown at 94 to the input signal conditioning portion of the microcomputer 90 through line 96.

The vehicle speed sensor shown at 98 measures the output shaft speed of the transmission and transfers a vehicle speed signal through line 100 to the input of the microcomputer. A manual control valve position sensor, identified in FIG. 3A as the range selector, delivers a signal to the microcomputer to determine when the range selector is moved from the neutral position to either the drive position D or to the reverse position R. The range sensor is shown in FIG. 3A in the neutral position.

Throttle position, engine speed, engine temperature, transmission oil temperature and a vehicle brake signal are the other input signals for the microcomputer. Each of these variables is illustrated in FIGS. 3A and 3B in schematic fashion.

Figure 4:
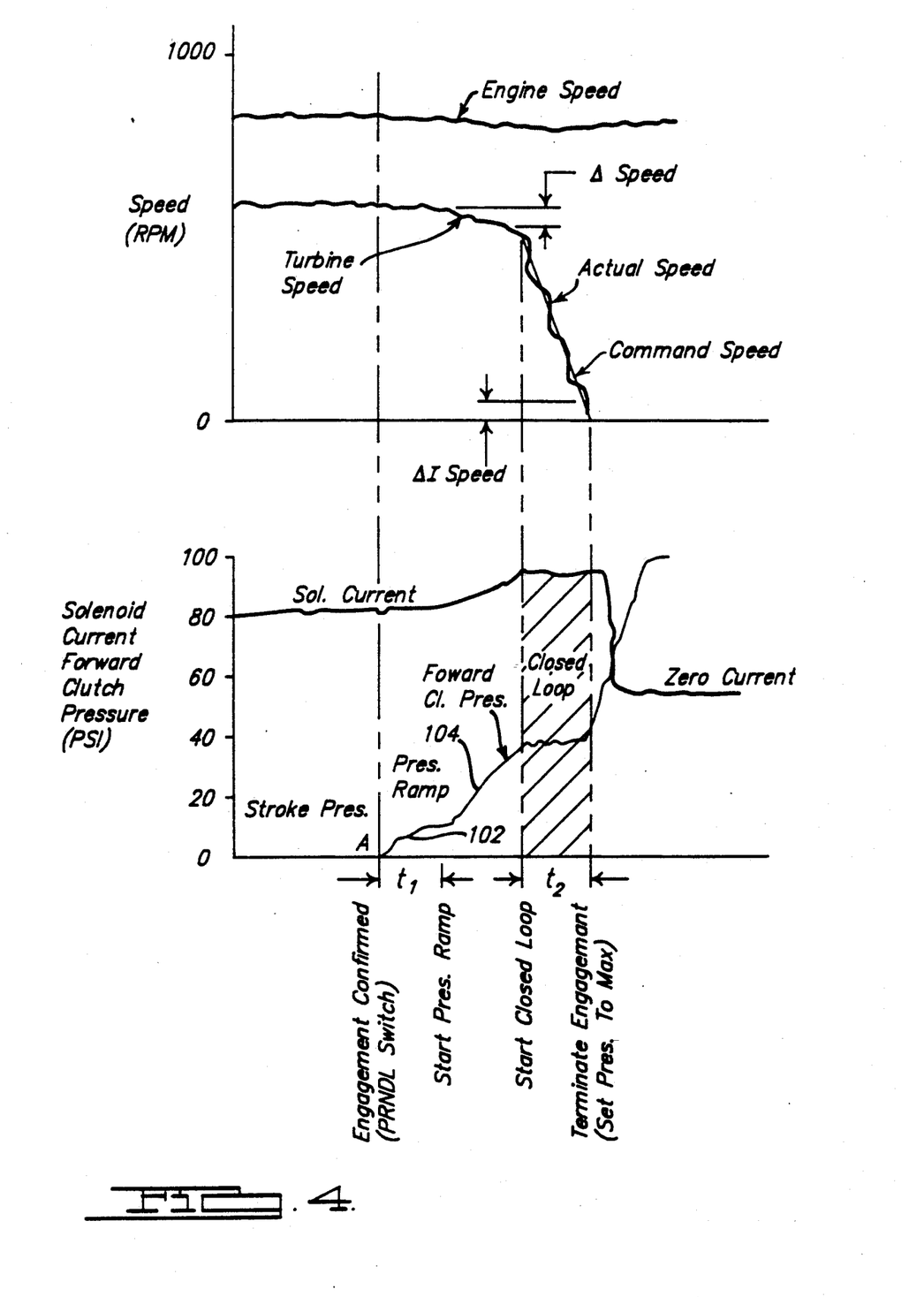
FIG. 4 is a diagrammatic representation of the control strategy for controlling the engagement of the forward clutch or the reverse clutch when engagement is commanded by moving the transmission manual valve.

The control strategy for the engagement of the forward clutch is illustrated in FIG. 4 where turbine speed is plotted in the upper portion of the diagram against time, and forward clutch pressure is plotted on a vertical axis in the lower portion of FIG. 4 against time. The engine speed is identified by an appropriate label, as illustrated in the upper portion of FIG. 4. The engine speed is relatively constant when the transmission is operated in neutral and the engine throttle is closed.

In FIG. 4, when the transmission manual valve is moved from the park or neutral position to the drive or reverse position, a switch attached to the manual driver control lever for the manual valve supplies a voltage to the microcomputer which indicates that the lever is in the forward range or the reverse range and that an engagement of the clutch is required to condition the transmission for drive. At that instant, which is shown at time "A" in FIG. 4, the pressure operated servo for the forward clutch is pressurized, permitting it to stroke toward the engaged position. This results in a gradual pressure buildup, as indicated at 102.

After a lapse of time $t_1$, as shown in FIG. 4, the forward clutch pressure ramp is initiated. This pressure ramp is shown in FIG. 4 at 104. During the ramping of the pressure, the turbine speed is continuously monitored by the turbine speed sensor and is distributed to the CPU where a comparison is made to determine whether the decrease in turbine speed is equal to a pre-calibrated turbine speed change $\Delta$, also shown in FIG. 4. If the value of the turbine speed change equals $\Delta$, a speed ramp command is initiated and the closed loop turbine speed control is initiated.

This closed loop control occurs over a time $t_2$, as indicated in FIG. 4. The turbine speed command is initiated at the actual speed value at the beginning of the closed loop control.

The value for the slbpe of the line in FIG. 4 that represents a commanded speed is fetched from memory in the microcomputer at the beginning of each closed loop control. The ramp progresses to zero turbine speed while the closed loop controller modulates the forward clutch pressure. This forces the turbine speed indicated by the turbine speed sensor, which is the actual turbine speed, to follow the turbine speed ramp. When the actual turbine speed is equal to $\Delta I$, as seen in the upper portion of FIG. 4, the forward clutch pressure distributed to the transmission forward clutch by the electro-hydraulic controls is set to the maximum pressure. Clutch engagement at that time is complete.

The value for $t_2$, which is pre-calibrated and Which is stored in memory and then addressed each background loop, is established to provide a smooth and responsive engagement. The closed loop turbine speed controller assures that successive engagements can be repeated over time. This successive repeating is carried out independently of variations in temperature, wear and other operating variables.

Figure 7:
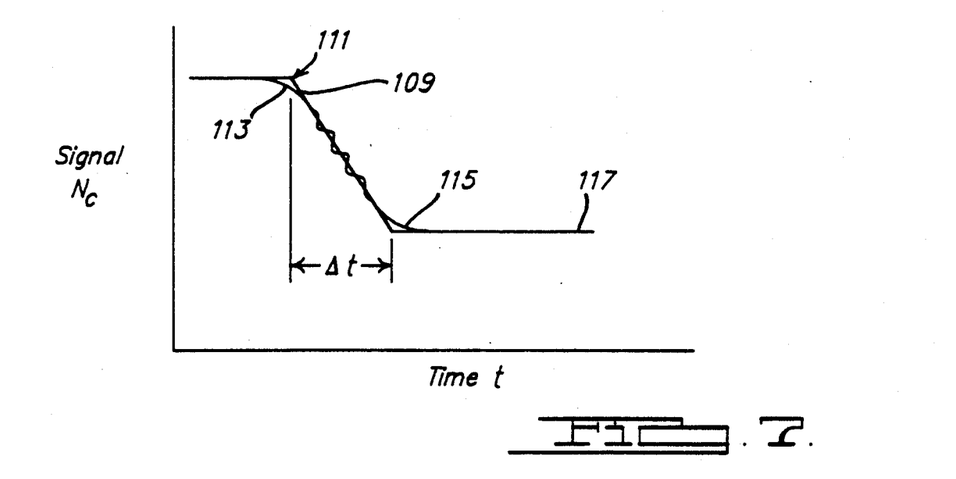
FIG. 7 is a chart showing the function of the shaping filter of FIG. 5 as it modifies the commanded input turbine speed signal to produce a filtered commanded turbine speed signal.

Referring next to FIG. 5, I have illustrated a block diagram of the turbine speed controller. In FIG. 5, the input commanded turbine speed signal is shown by the symbol $N_c$. That signal is distributed to a shaping filter 106. The shaping filter will modify the input turbine speed signal to eliminate sharp discontinuities in the functional relationship between the signal and time. This characteristic is shown in FIG. 7 where, on the vertical axis, there is plotted a value for the signal $N_c$. At the time the commanded speed is fetched from memory, the slope of the commanded speed line 109 in FIG. 7 is determined, and the shaping filter will eliminate the sharp discontinuity at 111 and substitute a blend line 113. This eliminates transients in the output signal as shown in FIG. 5 at $N_t$. A similar filtering technique is used at the end of the closed loop control mode as shown at 115. After the end of the commanded turbine speed line is reached, the turbine speed is at a lower steady state value as shown at 117 until the engine throttle is advanced. In this way the low pass filter 106 removes dynamic content of the commanded turbine speed signal.

In the diagram of FIG. 5, the symbol $N_c$ is the commanded turbine speed in RPM. The symbol $N_t$ is a filtered commanded turbine speed in RPM. The symbol $\epsilon$ (epsilon) is the error signal in RPM or the difference between the measured turbine speed and the filtered command turbine speed. The symbol PID is a subcircuit that performs proportional, differential and integral signal compensation or phase compensation.

The symbol $\Delta M(K)$ is the incremental duty cycle measured in per cent. The symbol $M(K-1)$ is the past duty cycle measured in per cent (i.e., it is the duty cycle that was developed during the preceding background loop of the processor). The symbol $M(K)$ is the present duty cycle expressed as a per cent. The symbol q is the solenoid fluid flow measured in cubic inches per second. The symbol $P_c$ is the forward clutch pressure measured in PSI and the symbol $N_t$ is the actual turbine speed measured in RPM.

The turbine speed that actually is present is measured by the turbine speed sensor 94 and is distributed to a summing point 108 where it is compared in value to the filtered commanded turbine speed. The turbine speed signal developed by sensor 94 is a feedback signal. The difference between the feedback signal and the filtered commanded turbine speed is the signal error $\epsilon$, which is distributed to the PID controller where phase compensation takes place. The PID controller 110 modifies the error signal with proportional, integral and differential compensation. The result of that adjustment is distributed to a gain adjustment element 112.

Figure 8:
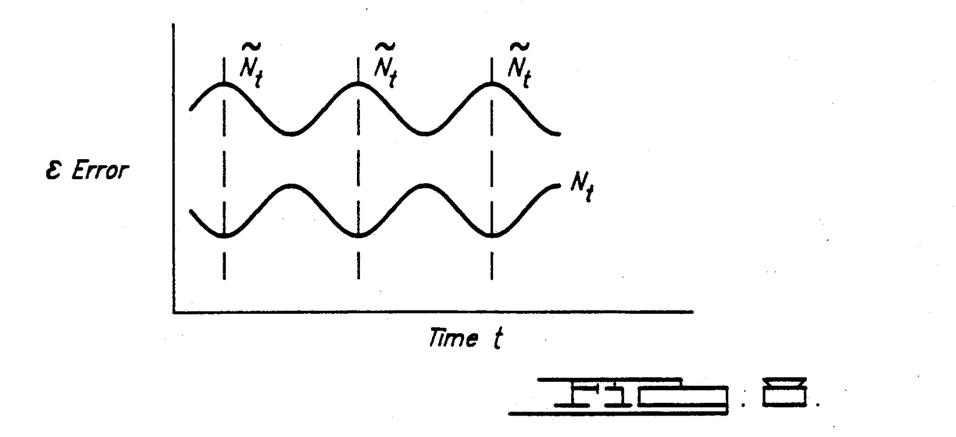
FIG. 8 is a chart that illustrates the phase difference between the actual turbine speed and the filtered commanded turbine speed prior to phase compensation by the PID controller of FIG. 5.

I have shown in FIG. 8 a chart that illustrates the function of the phase compensator 110. The filtered commanded turbine speed, when it is plotted on a chart with respect to time as shown in FIG. 8, has an earlier phase than the turbine speed signal developed by sensor 94. That difference in phase is due to the system delay in the hydraulics and in the electronics of the elements of FIG. 5. It is the purpose of the PID controller to shift the phase of the turbine speed $N_t$ to the left as much as possible so that the peaks on the $N_t$ curve in FIG. 8 will more nearly coincide with the peaks on the curve representing the filtered commanded turbine speed. This adjustment is made before the error signal is delivered to the gain adjustment element 112, thus improving the reliability of the system and the ability of the turbine speed to follow the commanded turbine speed as shown in FIG. 7. The system response to error $\epsilon$ is modified by the PID controller by adjusting the magnitude of the control terms.

The output of the proportional portion of the controller is directly varied in proportion to the input error in accordance with the relationship $P = K \cdot \epsilon$, where K is the gain of the proportional term. The gain will tend to increase the speed of system response. The proportional control, however, is not sufficient in itself because the increase in the gain K tends to increase instability in the system. Consequently, the amount that K can be varied is limited. For this reason, an integral term is used in the phase compensation at the compensator 110. A derivative action also is introduced by the compensator 110 to speed up the response of the control system. The derivative action has a stabilizing effect on the control system because of the addition of a phase lead to the control loop gain. That is, it reduces the phase lag of the gain.

The output of the gain adjustment that occurs at 112 is designated as ΔM(K). This incremental value is added to the total duty cycle M(K−1) that existed in the preceding background loop. This produces the present total duty cycle M(K).

In this embodiment of the invention the duty cycle M(K) is a pulse-width modulated duty cycle which is applied to a pulse-width modulated solenoid valve 114. This produces a hydraulic flow q which is a flow that is proportional to the commanded duty cycle. The flow q is the flow that exists in the line shown in FIG. 3 extending to the forward clutch. The forward clutch is schematically designated in FIG. 5 by reference character 116. The clutch pressure is designated in FIG. 5 by the symbol $P_c$. As pressure $P_c$ applies the forward clutch, the turbine speed is decreased as the turbine torque delivery flow path is established.

The turbine speed $N_t$, modified by the chain ratio of the torque transfer chain 24, is sensed by the turbine speed sensor 94 as previously explained. This turbine speed sensor can either be a variable reluctance sensor or a so called "Hall effect" sensor. In either case, the signal developed by the transducer is fed back and compared with the filtered commanded turbine speed $N_t$.

A pressure transducer is shown at 118. Provision is made for sensing the forward clutch pressure $P_c$, which is delivered to the pressure transducer 118, the output of which is distributed to the summing point 120 where the value for the present total duty cycle is obtained as previously explained. The pressure transducer 118 is part of a minor control loop which is faster in its execution than the main control loop. It improves the damping of the system and compensates for changes in operating variables such as temperature and altitude.

The output of the pressure transducer 118 is a signal which is distributed to the summing point at 120. This affects the result of the summation that occurs. Thus a faster response to variables that affect the signal that is fed back in a closed loop manner to the summing point 108 can be obtained. The minor control loop, of which transducer 118 is a part, improves the system dynamics of the overall control loop.

Figure 6:
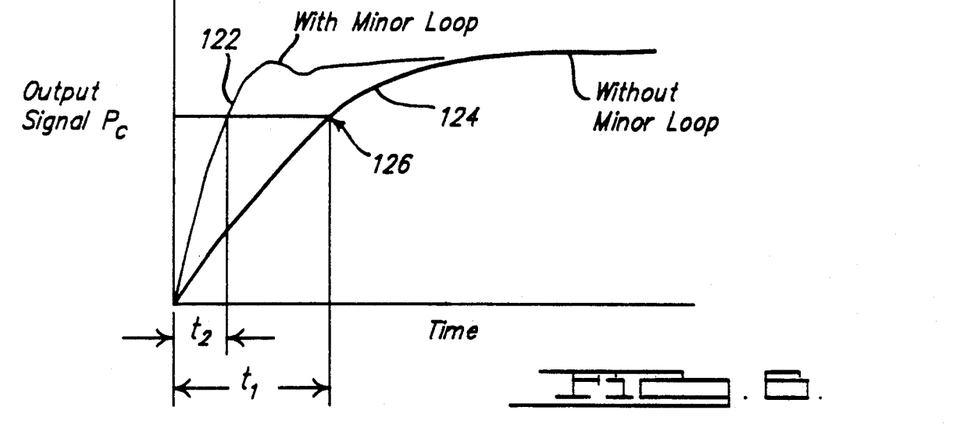
FIG. 6 is a chart that shows the effect of a minor loop control that is sensitive to the clutch supply pressure to improve the overall system dynamics by decreasing the response time of the turbine speed controller.

This difference in the rate of buildup of the pressure $P_c$ is illustrated in FIG. 6. Numeral 122 designates a relationship between the output signal and time when the minor loop is in operation and the output of the pressure transducer delivers a minor loop feed back signal to the summing point 120. On the other hand, the corresponding relationship which exists without the minor loop in place is designated by reference number 124. For any given value for the output signal, such as the value occurring at point 126, a time $t_1$ is required before that output signal value is achieved. On the other hand, if the minor loop, of which the pressure transducer 118 is part, is in place, the corresponding time to reach the same signal value is shorter, as shown at $t_2$.

Referring again to the PID controller 110, the difference equation that implements the phase compensation can be designated as a functional value $f_{(K)}$ where K is the effective gain factor. The complete difference equation is expressed as follows:

$$f(K) = K_p[N\epsilon(K) - N\epsilon(K-1)] + K_D[N\epsilon(K) - 2N\epsilon(k-1) + N\epsilon(K-2)] + K_I N\epsilon(K)$$

In the preceding equation, the value K indicates the present gain factor that is sampled during any given background loop of the controller. The corresponding gain factor for the immediately preceding background loop is K−1. The corresponding gain factor that is sampled during the second preceding background loop is designated as K−2. Further, the proportional, integral and derivative gain factors are expressed as $K_p$, $K_D$ and $K_I$, respectively. The symbol Nε is the turbine speed error.

Having described a preferred embodiment of my invention, what I claim and desire to secure by U.S. Letters Patent is:

1. An automatic power transmission for delivering torque from an engine to a torque output member comprising a torque input member adapted to be driven by said engine;

a multiple ratio gear assembly having interacting gear elements, one of which is adapted to be connected drivably to said torque output member, first clutch means for selectively connecting together two elements of said gear assembly, brake means for selectively anchoring an element of said gear assembly to establish a torque reaction point;

second clutch means for connecting selectively said torque input member to a torque input element of said gear assembly, said second clutch means interrupting a torque delivery path between said engine and said torque output member when it is disengaged;

a hydraulic valve control including a pump and a solenoid operated valve means for controlling distribution of clutch actuating fluid from said pump to said second clutch means;

means for continuously monitoring the speed of said torque input member and for developing an electrical actual speed signal indicating the instantaneous speed of said torque input member;

an electronic processor means characterized by periodic control loops for sampling in each loop an error between said speed signal and a commanded speed signal value, said processor including a memory for storing commanded speed signal values, said commanded speed signal being related to clutch engagement time with a pre-determined functional relationship that corresponds to a smooth clutch engagement for an engine and driveline, and a processor unit adapted to address said memory to obtain said commanded speed signal and to compare said commanded speed to said torque input member speed to obtain an adaptive error signal determinative of said error; and means for developing an actuating electrical signal for said solenoid-operated valve means that is functionally related to said error signal whereby said second clutch means has smooth engagement characteristic with a controlled rate of engagement in a closed loop manner thus eliminating harshness caused by inertial effects as said transmission is conditioned for torque delivery, the engagement characteristic being repeatable in successive engagements regardless of changes in transmission variables.

2. An automatic power transmission for an automotive vehicle having a throttle controlled engine and traction wheels comprising planetary gear units including gear elements that define in part plural torque flow paths between said engine and said traction wheels;

said transmission including a hydrokinetic unit with an impeller connected to said engine and a turbine;

a friction clutch means for selectively connecting said turbine to a torque input portion of said gear unit, said torque flow paths being interrupted when said friction clutch is release;

a hydraulic valve control including a pump and a solenoid operated valve means for controlling distribution of clutch actuating fluid from said pump to said friction clutch means;

means for monitoring the speed of said turbine for developing an electrical actual speed signal indicating the instantaneous speed of said turbine;

an electronic processor means characterized by periodic control loops for sampling in each loop an error between said speed signal and a commanded speed signal, said processor including a memory for storing commanded speed signal values, said commanded speed signal being related to clutch engagement time with a pre-determined functional relationship that corresponds to smooth clutch engagement for an engine and driveline and a processor unit adapted to address said memory to obtain said commanded speed signal and to compare said commanded speed to said turbine speed to obtain an adaptive speed error signal; and means for developing an actuating electrical signal for said solenoid operated valve means that is functionally related to said error signal whereby said friction clutch has a smooth engagement characteristic with a controlled rate of engagement in a closed loop manner thus eliminating harshness caused by inertial effects as said transmission is conditioned for torque delivery, the engagement characteristic being repeatable in successive engagements regardless in changes of transmission variables.

3. The combination as set forth in claim 1 wherein said valve control includes a means for sensing pressure in said second clutch means, a pressure-to-electrical signal transducer means for developing a feedback signal that is determinative of said pressure of said second clutch means;

said memory being adapted to store a prior error signal developed by said processor in a preceding control loop and said processor unit being adapted to add said prior error signal to the error signal in the current control loop and to said feedback signal to develop an actuating electrical signal for said solenoid operated valve means.

4. The combination as set forth in claim 1 wherein said processor includes means for developing a gain adjustment for said actuating electrical signal that is incremental to the gain developed in a preceding control loop whereby the effective electrical signal for said solenoid operated valve means is the sum of the gain adjusted error signal for successive control loops.

5. The combination as set forth in claim 4 wherein said valve control includes a means for sensing pressure in said second clutch means and a pressure-to-electrical signal transducer means for developing a feedback signal that is determinative of said pressure in said second clutch means.

6. The combination as set forth in claim 2 wherein said processor includes means for developing a gain adjustment for said actuating electrical signal that is incremental to the gain developed in a preceding control loop whereby the effective electrical signal for said solenoid operated valve means is the sum of the gain adjusted error signal for successive control loops.

7. The combination as set forth in claim 6 wherein said valve control includes a means for sensing pressure in said second clutch means and a pressure-to-electrical signal transducer means for developing a feedback signal that is determinative of said pressure in said second clutch means.

* * * * *

UNITED STATES PATENT AND TRADEMARK OFFICE
CERTIFICATE OF CORRECTION

PATENT NO. : 5,179,875

DATED : January 19, 1993

INVENTOR(S) : Larry T. Brown

It is certified that error appears in the above-identified patent and that said Letters Patent is hereby corrected as shown below:

Col. 9, line 40, delete "slbpe" and insert --slope--.

Col. 10, line 7, delete "$N_t$" and insert --$\tilde{N}_t$--.

Signed and Sealed this

Ninth Day of November, 1993

Attest:

BRUCE LEHMAN

Attesting Officer                Commissioner of Patents and Trademarks